United States Patent
Jensen et al.

(10) Patent No.: US 10,010,819 B2
(45) Date of Patent: Jul. 3, 2018

(54) KEYED SPIN-ON FILTER ELEMENT

(71) Applicant: Parker-Hannifin Corporation, Cleveland, OH (US)

(72) Inventors: Russell D. Jensen, Modesto, CA (US); Jeffrey W. Laforge, Oakdale, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 32 days.

(21) Appl. No.: 14/417,301

(22) PCT Filed: Jul. 26, 2013

(86) PCT No.: PCT/US2013/052181
§ 371 (c)(1),
(2) Date: Jan. 26, 2015

(87) PCT Pub. No.: WO2014/018825
PCT Pub. Date: Jan. 30, 2014

(65) Prior Publication Data
US 2015/0190742 A1  Jul. 9, 2015

Related U.S. Application Data

(60) Provisional application No. 61/675,965, filed on Jul. 26, 2012.

(51) Int. Cl.
*B01D 35/30* (2006.01)
*B01D 27/08* (2006.01)

(52) U.S. Cl.
CPC ........... *B01D 35/306* (2013.01); *B01D 27/08* (2013.01); *B01D 2201/4015* (2013.01);
(Continued)

(58) Field of Classification Search
CPC ............ B01D 27/08; B01D 2201/4053; B01D 2201/4061; B01D 35/306;
(Continued)

(56) References Cited

U.S. PATENT DOCUMENTS 3,119,367 A  1/1964  Barnes, Jr. et al.
3,342,022 A  9/1967  Donguuy et al.
(Continued)

FOREIGN PATENT DOCUMENTS

AU    1290888      10/1988
CN    2402666 Y    10/2000
(Continued)

OTHER PUBLICATIONS

International Search Report for corresponding Patent Application No. PCT/US2013/052181 dated Oct. 16, 2013.
(Continued)

*Primary Examiner* — David C Mellon
*Assistant Examiner* — Liam Royce
(74) *Attorney, Agent, or Firm* — Renner, Otto, Boisselle & Sklar, LLP (57) ABSTRACT

A filter element for installation in a filter element adapter assembly with a keyed retractable shroud for covering external threads configured to receive the filter element is provided. The filter element includes an end cap having one or more keyed fingers protruding axially and radially therefrom, to engage with keyed passageways on the retractable shroud.

22 Claims, 11 Drawing Sheets (52) U.S. Cl.
CPC .............. *B01D 2201/4023* (2013.01); *B01D 2201/4046* (2013.01); *B01D 2201/4053* (2013.01); *B01D 2201/4092* (2013.01)

(58) Field of Classification Search
CPC .... B01D 2201/4015; B01D 2201/4046; B01D 2201/4092; B01D 2201/4076; B01D 2201/30; B01D 2201/301; B01D 2201/305; B01D 2201/306
USPC .............................. 210/232–238, 440, 443
See application file for complete search history.

(56) References Cited

U.S. PATENT DOCUMENTS

| | | | |
|---|---|---|---|
| 3,390,778 A | 7/1968 | Uhen | |
| 3,625,363 A | 12/1971 | Eberle | |
| 3,812,816 A | 5/1974 | Juhasz | |
| 4,052,307 A | 10/1977 | Humbert | |
| 4,369,113 A | 1/1983 | Stifelman | |
| 4,719,012 A | 1/1988 | Groezinger et al. | |
| 4,743,374 A | 5/1988 | Stifelman | |
| 5,035,797 A | 7/1991 | Janik | |
| 5,116,499 A | 5/1992 | Deibel | |
| 5,186,829 A | 2/1993 | Janik | |
| 5,301,958 A | 4/1994 | Covington | |
| 5,490,930 A | 2/1996 | Krull | |
| 5,622,623 A | 4/1997 | Stone | |
| 5,788,859 A | 8/1998 | Biere | |
| 5,817,232 A | 10/1998 | Roll et al. | |
| 5,902,478 A | 5/1999 | O'Ryan | |
| 5,904,844 A | 5/1999 | Stone | |
| 5,906,740 A | 5/1999 | Brown et al. | |
| 5,951,728 A | 9/1999 | Hopson | |
| 5,988,399 A | 11/1999 | Brown et al. | |
| 6,006,924 A | 12/1999 | Sandford | |
| 6,015,492 A | 1/2000 | Popoff et al. | |
| 6,023,834 A | 2/2000 | Brown et al. | |
| 6,110,365 A | 8/2000 | Bartels et al. | |
| 6,146,527 A | 11/2000 | Oelschlaegel | |
| 6,158,592 A | 12/2000 | Reinhart et al. | |
| 6,202,859 B1 | 3/2001 | Langsdorf et al. | |
| 6,270,660 B1 | 8/2001 | Roll et al. | |
| 6,328,883 B1 | 12/2001 | Jensen | |
| 6,355,169 B1 | 3/2002 | Smith | |
| 6,423,222 B1 | 7/2002 | Shively et al. | |
| 6,464,869 B1 | 10/2002 | Hsu | |
| 6,471,071 B1 | 10/2002 | Shoaf et al. | |
| 6,571,961 B2 | 6/2003 | Demirdogen | |
| 6,588,602 B1 | 7/2003 | McKenzie | |
| 6,723,239 B2 | 4/2004 | Maxwell | |
| 7,175,030 B2 | 2/2007 | Fall et al. | |
| 7,232,522 B1 | 6/2007 | Lasley et al. | |
| 7,695,618 B2* | 4/2010 | Mules .................... | B01D 27/08 210/232 |
| 8,057,669 B2 | 11/2011 | Beard et al. | |
| 2001/0037971 A1 | 11/2001 | Bergeron | |
| 2002/0148096 A1 | 10/2002 | Brown et al. | |
| 2003/0196947 A1* | 10/2003 | Gundrum ............... | B01D 29/11 210/232 |
| 2005/0000885 A1* | 1/2005 | Stockbower ......... | B01D 29/114 210/435 |
| 2005/0023226 A1 | 2/2005 | Bastick et al. | |
| 2005/0178706 A1 | 8/2005 | Bagci et al. | |
| 2006/0096934 A1 | 5/2006 | Weinberger et al. | |
| 2006/0180539 A1 | 8/2006 | Wolf et al. | |
| 2007/0209992 A1 | 9/2007 | Johnson et al. | |
| 2007/0267339 A1 | 11/2007 | Munn | |
| 2008/0237113 A1* | 10/2008 | Jensen .................... | B01D 27/08 210/232 |
| 2012/0261323 A1* | 10/2012 | Badeau .................. | B01D 27/08 210/232 |

FOREIGN PATENT DOCUMENTS

| | | |
|---|---|---|
| CN | 1642613 A | 7/2005 |
| CN | 102065974 A | 5/2011 |
| CN | 102271778 A | 12/2011 |
| DE | 19948767 | 4/2001 |
| EP | 1090666 | 9/2000 |
| JP | 3690750 | 8/2005 |
| WO | 03/082434 A1 | 10/2003 |
| WO | 2006/120326 | 11/2006 |
| WO | 2008/118939 | 10/2008 |
| WO | 2011/056857 A1 | 5/2011 |

OTHER PUBLICATIONS

International Preliminary Report on Patentability for corresponding Patent Application No. PCT/US2013/052181 dated Feb. 5, 2015.
Office Action with translation for corresponding Chinese Patent Application No. 201380047215.2 dated Dec. 3, 2015.
Communication Pursuant to Article 94(3) EPC for corresponding EP Application No. 13747917.6, dated Oct. 2, 2017.

* cited by examiner

KEYED SPIN-ON FILTER ELEMENT

This application is a national phase of International Application No. PCT/US2013/052181 filed Jul. 26, 2013 and published in the English language, which claims the benefit of U.S. Provisional Application No. 61/675,965 filed Jul. 26, 2012, which is hereby incorporated herein by reference.

RELATED APPLICATIONS

This application claims the benefit of U.S. Provisional Application No. 61/675,965 filed Jul. 26, 2012, which is hereby incorporated herein by reference.

FIELD OF INVENTION

The present invention relates generally to spin-on filters, and more particularly to a keyed spin-on filter for use with a locked adapter.

BACKGROUND

A fuel filter is usually situated in a fuel line and screens out dirt, water, and rust particles from the fuel. Fuel filters are normally made into cartridges containing a filter paper and often use a threaded connection (spin-on filters). They are found in most internal combustion engines.

SUMMARY OF INVENTION

In order to ensure that the proper fuel filter is used in an application, the filter adapter (head) may be keyed to accept only authorized filters. Thus, when locked, threads on the adapter may be covered preventing attachment of unauthorized filters. The unlocking mechanism for the adapter may be conveniently located on the filter element.

Therefore, according to one aspect of the invention, a filter element for installation in a filter head includes a canister enclosing a ring of media, and an end cap at an open end of the canister. The end cap includes a main body with a threaded aperture for connecting the element with the filter head, and one or more keyed fingers protruding from the main body for engaging a locking mechanism associated with the filter head.

Optionally, the fingers are radially offset from the threaded aperture.

Optionally, the keyed fingers protrude axially outwardly from the main body.

Optionally, at least one keyed finger includes a radially extending arm portion defining therebeneath a capture region.

Optionally, the keyed fingers are axially outwardly and radially offset from the threaded aperture.

Optionally, the keyed fingers include radially extending arm portions spaced axially outwardly from the balance of the end cap.

Optionally, the keyed fingers define therebeneath a space axially and radially offset from the threaded aperture that can receive a cantilevered bridge portion of a latching body associated with the filter head.

Optionally, the keyed fingers protrude radially inwardly.

Optionally, the filter element has four keyed fingers.

Optionally, the keyed fingers are axially extending hoops.

Optionally, the filter element includes a second cap closing a second open end of the canister.

According to another aspect of the invention, a filter element for installation in a filter element adapter assembly with a keyed retractable shroud for covering threads configured to receive the filter element is provided. The filter element includes a filtering media compiled in a cylindrical pack defining a longitudinal axis and having an outer radial surface, an inner radial surface defining a fluid chamber, a first axial end face, and a second axial end face; and a first end cap having a main body with an axially inward side and an axially outward side. The end cap includes an annular shelf on the axially inward side on which the first axial end face of the filtering media sits, a threaded central passage positioned radially inward of the annular shelf in fluid communication with the fluid chamber of the filtering media, and one or more keyed fingers coupled to the main body and protruding radially therefrom, the keyed fingers positioned on the axially outward side of the main body and radially outward of the central bore.

Optionally, the keyed fingers protrude axially away from the filter media.

Optionally, the keyed fingers include end portions extending axially toward the filter media.

Optionally, radially inward portions of the keyed fingers are attached to adjacent portions of the end cap main body.

Optionally, the keyed fingers protrude radially inwardly.

Optionally, the keyed fingers are shaped, sized, and situated for full insertion of the keyed fingers into the retractable shroud.

Optionally, the filter element has four keyed fingers.

Optionally, the keyed fingers are axially extending hoops.

Optionally, the filter element includes a second cap sealing the second axial edge of the filtering media.

According to another aspect of the invention, a filter element housing adapter assembly for receiving a keyed filter element includes an adapter body having one or more fluid passageways; a threaded stud defining a longitudinal axis; a latching body moveable from a shrouding position to an uncovering position, a retaining ring radially protruding from the threaded stud; a locking ring moveable from a locking position to an unlocking position, wherein in the locking position the locking ring is configured to bias the one or more locking fingers of the latching body toward the retaining ring; and a spring element configured to bias the locking ring toward the locking position. The latching body includes a shroud configured to shroud threads of the threaded stud when the latching body is in the shrouding position and to uncover the threads when the latching body is in the uncovering position, a brim portion extending in an axial direction, one or more locking fingers extending in an axial direction and connected to the brim portion by a radially extending bridge portion, the brim portion and locking fingers radially offset from each other to form a cradle portion therebetween, and one or more axially extending keyed passages in the brim portion.

Optionally, the keyed passages also extend in a circumferential direction such that open ends of the keyed passages are circumferentially offset from closed ends of the keyed passages.

Optionally, the shroud is an annular shroud circumferentially surrounding the threaded stud.

Optionally, the locking ring includes a radially extending hub portion and an axially extending rim portion.

Optionally, the axially extending rim portion is configured to extend into the cradle portion of the latching body.

Optionally, the threaded stud is exteriorly threaded.

Optionally, the brim portion is radially outward of the locking fingers.

Optionally, the threaded stud is threadably coupled to the adapter body.

According to another aspect of the invention, a method of installing the filter element into a filter element housing adapter includes the steps of inserting keyed fingers of the filter element into keyed passageways of the adapter; unlocking a retractable shroud with the keyed fingers; retracting the retractable shroud; and threading the filter element onto the adapter.

The foregoing and other features of the invention are hereinafter described in greater detail with reference to the accompanying drawings.

DETAILED DESCRIPTION

Figure 1:
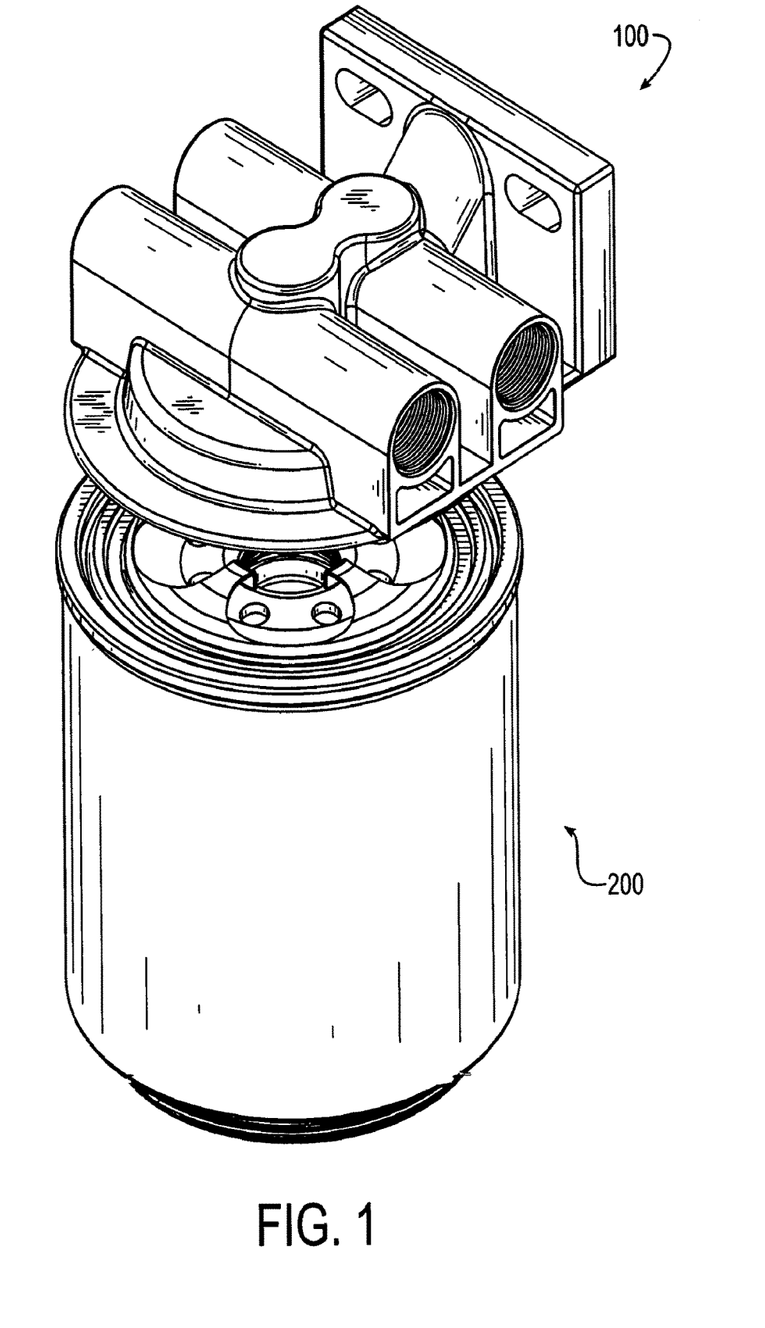
FIG. 1 shows a perspective view of an exemplary filter element having keyed fingers detached from an exemplary filter element adapter assembly.
Figure 2:
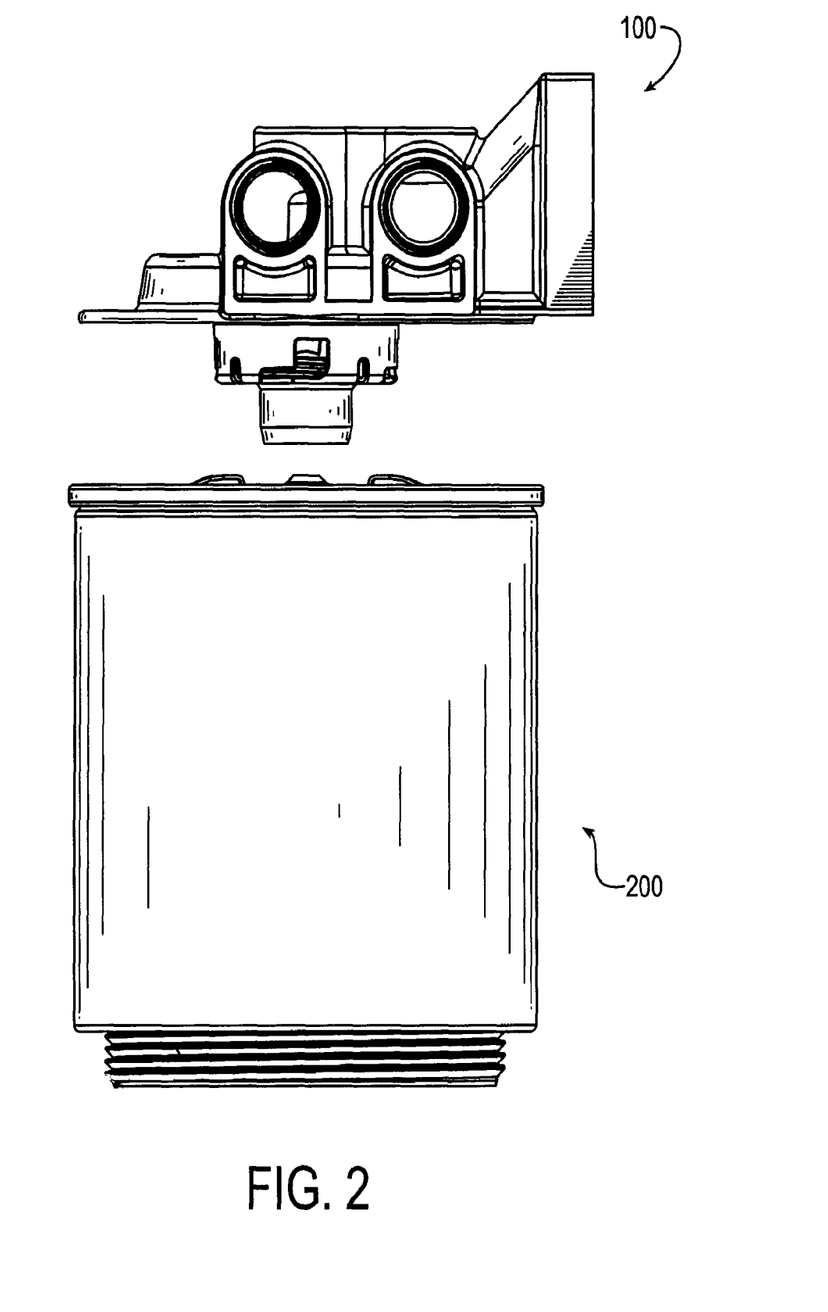
FIG. 2 shows a side view of an exemplary filter element having keyed fingers detached from an exemplary filter element adapter assembly.
Figure 3:
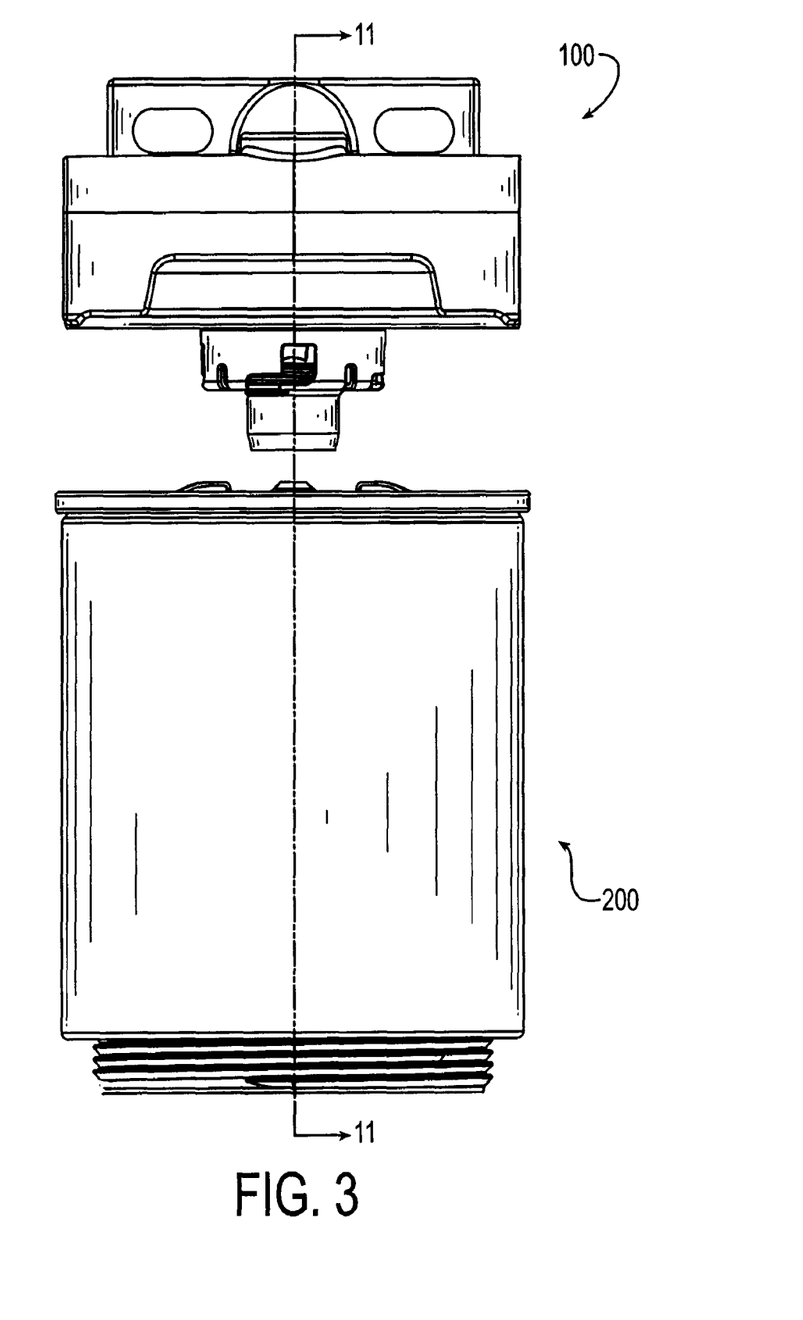
FIG. 3 shows another side view of an exemplary filter element having keyed fingers detached from an exemplary filter element adapter assembly with a section line at A-A.
Figure 4:
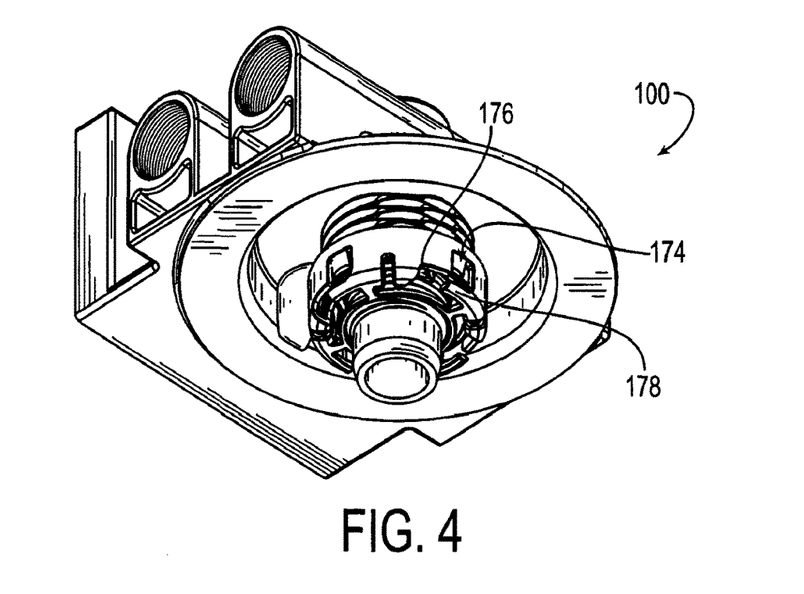
FIG. 4 shows a perspective view of an exemplary adapter assembly having a retractable shroud.
Figure 5:
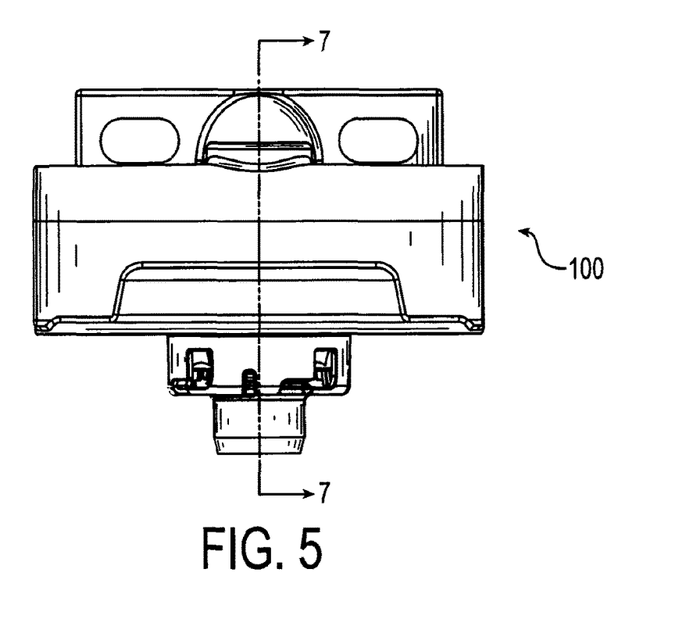
FIG. 5 shows a side view of an exemplary adapter assembly having a retractable shroud with a section line at C-C.

Referring first to FIGS. 1-3, shown is an exemplary filter element adapter (or filter head) assembly 100 and a filter element (or filter cartridge) 200 detached from the adapter assembly.

Figure 6:
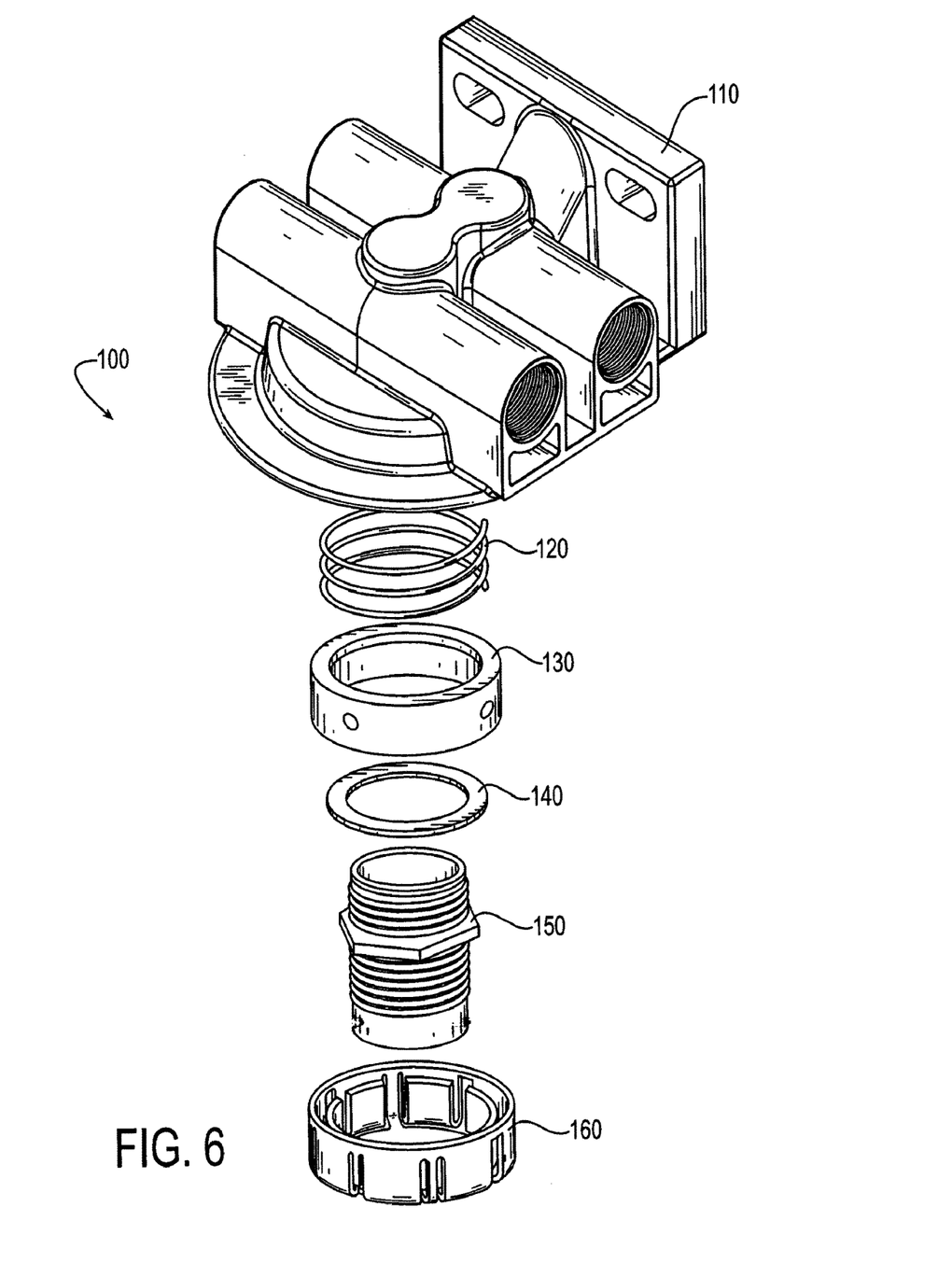
FIG. 6 shows an exploded view of an exemplary adapter assembly having a retractable shroud and a removable threaded stud.

The exemplary filter element adapter assembly is shown in more detail in FIGS. 4-9. Referring especially to FIG. 6 showing an exploded view of the filter element adapter assembly (or simply "adapter" or "adapter assembly") 100, the adapter includes an adapter body 110, a spring element 120, a locking ring 130, a retaining ring 140, a threaded stud 150, and a latching body 160.

Figure 7:
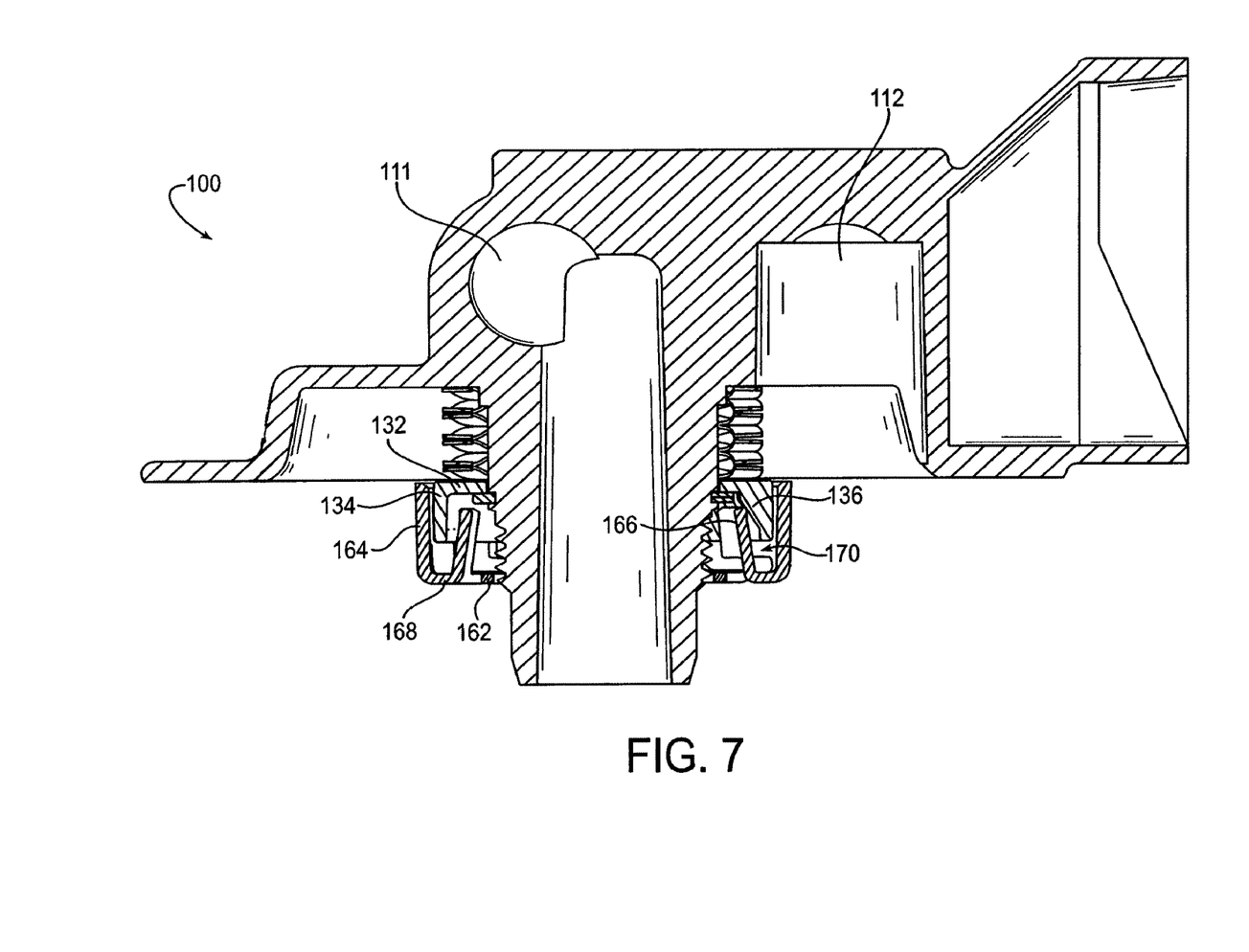
FIG. 7 shows a partial sectional view taken from view C-C of FIG. 5 of an exemplary adapter assembly having an integral threaded stud.
Figure 8:
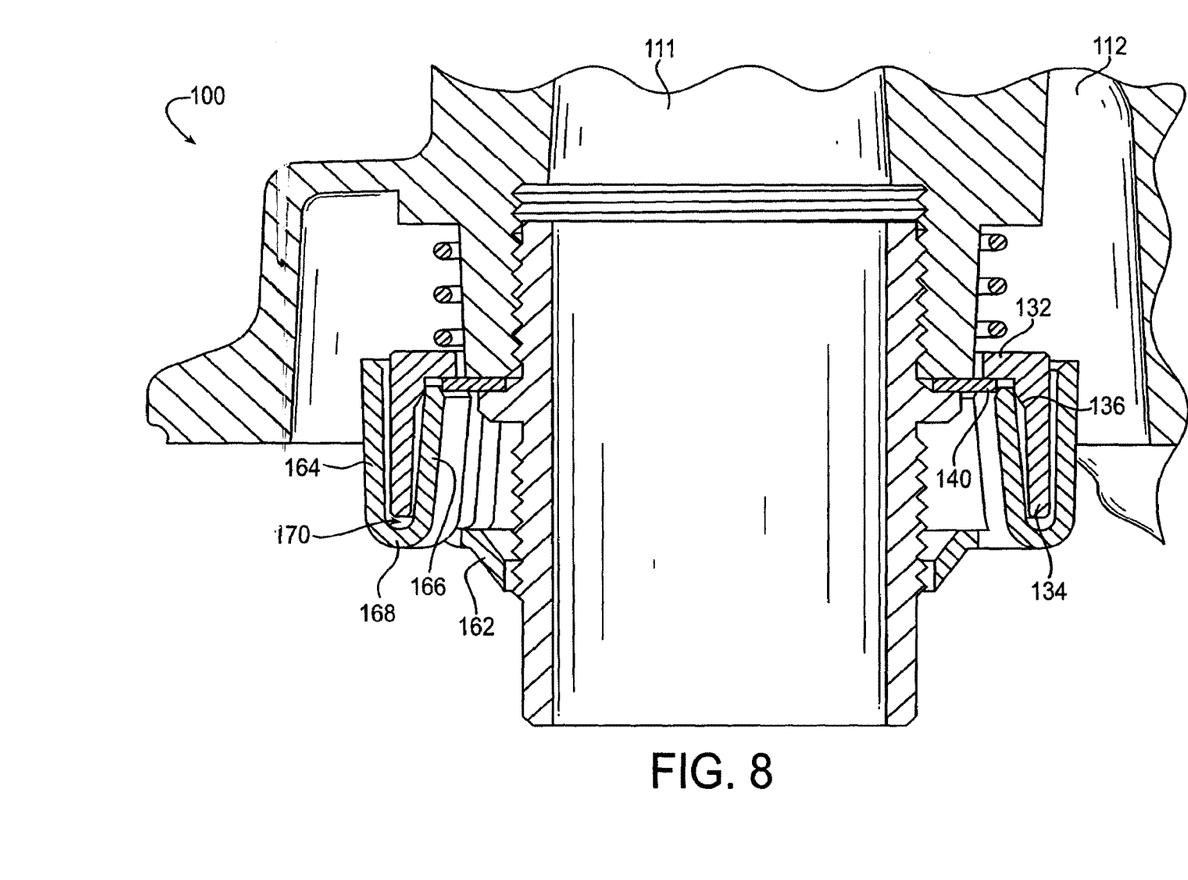
FIG. 8 shows a partial sectional view taken from view C-C of FIG. 5 of an exemplary adapter assembly having a removable threaded stud.

As seen best in FIGS. 7 and 8, the adapter body 110 may include one or more fluid passageways 111, 112 for connecting to an attached filter element 200. For example, the adapter body may have a central fluid passage 111 for fluid communication with a central chamber of an attached filter element 200, and a radially outward fluid passage 112 for fluid communication with a radially outward chamber of an attached filter element 200. Alternatively, the adapter body 110 may have fewer or more fluid passageways, depending on the application. Further, the adapter body 110 may include one or more assembled parts or may be of one-piece construction. Further, one or more other elements of the adapter 100 described herein may be integral with the adapter body 110 or may be separate parts assembled together with the body 110 as illustrated herein.

Figure 9:
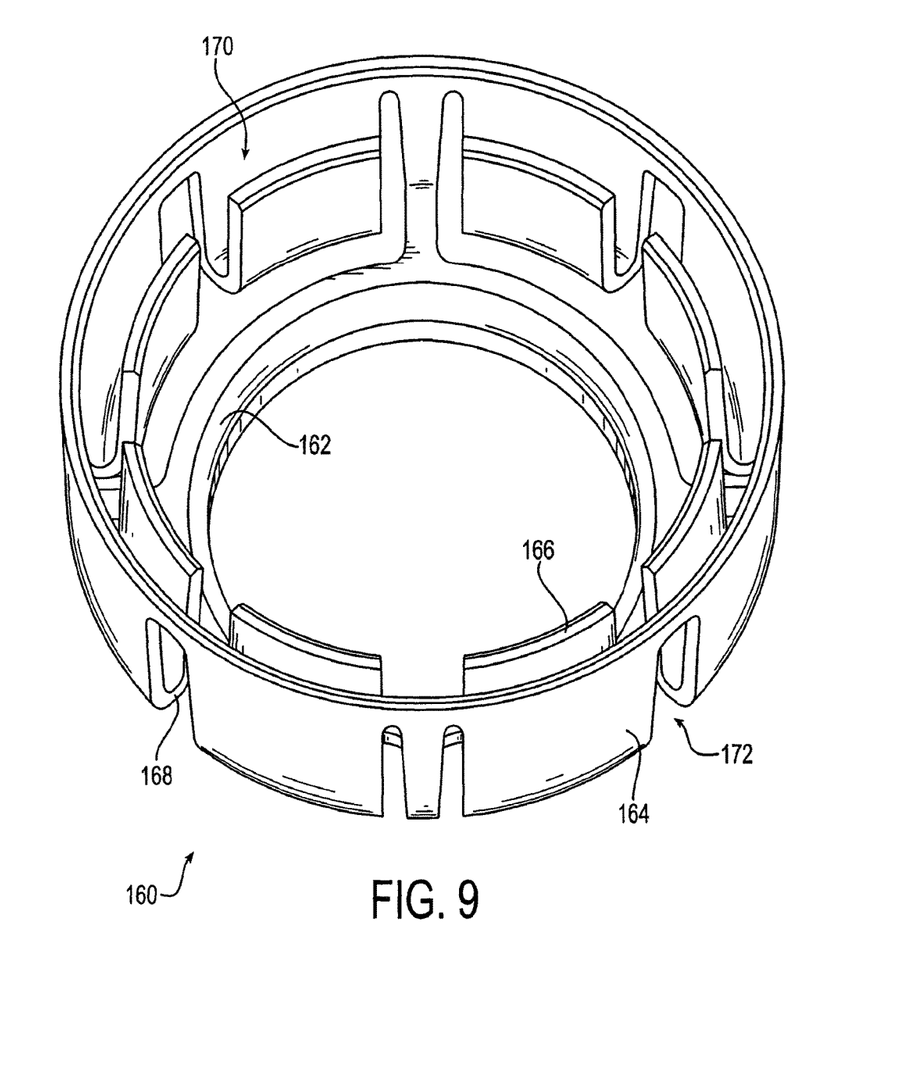
FIG. 9 shows a perspective view of an exemplary latching body for use in exemplary adapter assemblies.

Referring now to FIGS. 7-9, a latching body 160 is shown. The latching body 160 may be made of any suitable material (e.g., plastic or metal) and is moveable from a shrouding position to an uncovering position. As illustrated, in exemplary embodiments, the shrouding position is axially away from the adapter body 110 and the uncovering position is axially toward the adapter body 110. However, those skilled in the art will appreciate that the directions may be reversed in some embodiments or may involve movement other than axial movement.

The latching body 160 includes a shroud 162 configured to shroud threads of the threaded stud 150 when the latching body is in the shrouding position and to uncover the threads when the latching body is in the uncovering position. The shroud 162 may extend axially away from the adapter body 110 when assembled therewith. Further, as shown, the shroud 162 may be annular and may completely or partially circumferentially surround the threaded stud 150. In the exemplary embodiment illustrated, the shroud is radially outward of the threaded stud 150. However, those skilled in the art will recognize that the shroud (and/or the entire latching body 160) may be radially inward of the threaded stud 150 in embodiments in which the threaded stud 150 is internally threaded rather than externally threaded.

The latching body 160 also includes a brim portion 164 extending in an axial direction. The brim portion may be annular. The latching body 160 may also include one or more locking fingers 166 extending in an axial direction and connected to the brim portion 164 by a radially extending bridge portion 168. The brim portion 164 and locking fingers 166 may be radially offset from each other to form a cradle portion 170 therebetween. The brim portion may be radially outward of the locking fingers, although in other arrangements the brim portion 164 and locking fingers 166 may be reversed.

The brim portion 164 may also include one or more axially extending keyed passages 172. These passages 172 are where the keyed fingers of the filter element will fit in order to unlock the shroud mechanism. In some exemplary embodiments the keyed passages 172 are simply axially extending. However, in other exemplary embodiments, for example those shown in FIGS. 2-5, the keyed passages 172 also extend in a circumferential direction such that an outer portion (the open end) 176 of the keyed passages are circumferentially offset from an inner portion (closed end) 174 of the keyed passages 172. This offset arrangement will prevent keys that extend in only the axial direction from unlocking the shroud mechanism by precluding passage of a key directly into the inner portion 174. This arrangement creates a cantilevered bridge portion 178 which guards the inner portion 174 of the keyed passage.

The retaining ring 140 radially protrudes from the threaded stud. The retaining ring 140 may be integral from the threaded stud, although in illustrated exemplary embodiments, the retaining ring 140 is a separate piece, and may be made of any suitable material such as, e.g., plastic or metal. The retaining ring should be at least partially rigid in order to prevent upward movement of the latching body 160 when the locking fingers 166 are engaged with the retaining ring 140.

The locking ring 130 may be made of any suitable material (such as, e.g., plastic or metal) and is moveable from a locking position to an unlocking position. In the locking position the locking ring 130 is configured to bias the locking fingers 166 toward the retaining ring (e.g., radially inwardly). When biased toward the retaining ring, the locking fingers 166 should be axially adjacent the retaining ring (in the illustrated embodiment, axially away from the adapter body 110, or "downward") and thus will prevent axial movement of the latching body 160 (in the illustrated embodiment, it will prevent movement axially toward the adapter body, or "upward"). In the illustrated embodiment, the locking ring 130 is axially moveable, and the locking position is axially away from the adapter body 110 and the unlocking position is axially toward the adapter body 110. The locking ring may take any suitable shape, but in exemplary embodiments includes a radially extending hub portion 132 and an axially extending rim portion 134, extending axially away from the adapter body 110 from a radially outer portion of the hub portion 132. The axially extending rim portion 134 may extend into the cradle portion 170 of the latching body 160.

In order to bias the locking fingers 166, the locking ring may include an angled ramp portion 136 radially inward of the rim portion 134. The ramp portion 136 may be a solid annular ramp portion, or may include a plurality of circumferentially separated ramp segments.

The adapter assembly 100 also includes a spring element 120 (for example, a standard metal coil spring, a plastic spring, a wave spring, or the like) configured to bias the locking ring toward the locking position.

The threaded stud 150 may project from a portion of the adapter assembly 100 and defines a longitudinal axis about which other components are assembled. As shown, the threaded stud 150 may be exteriorly threaded. However those with skill in the art will appreciate that an interiorly threaded stud would also be possible. The threaded stud 150 may be threadably coupled to the adapter body 110 or may be of one-piece construction with the body 110.

Figure 10:
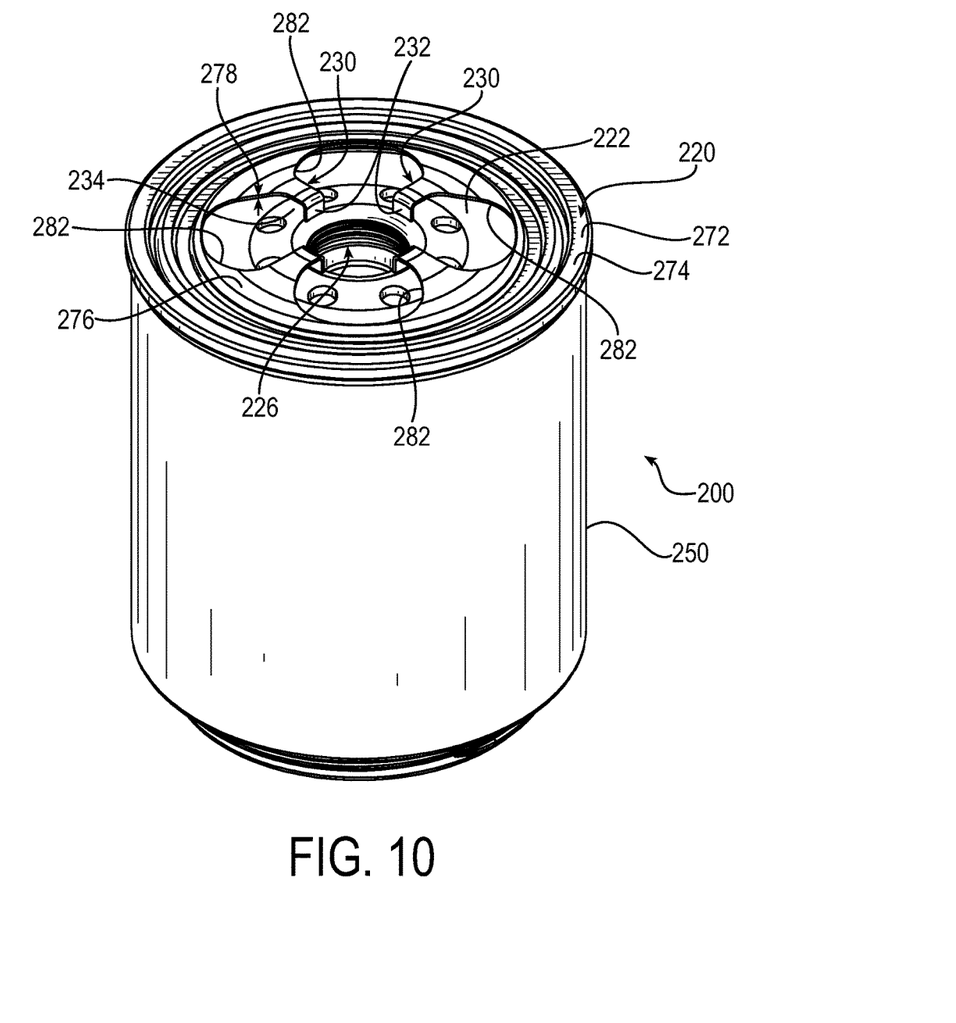
FIG. 10 shows a perspective view of an exemplary filter element having four keyed fingers.
Figure 11:
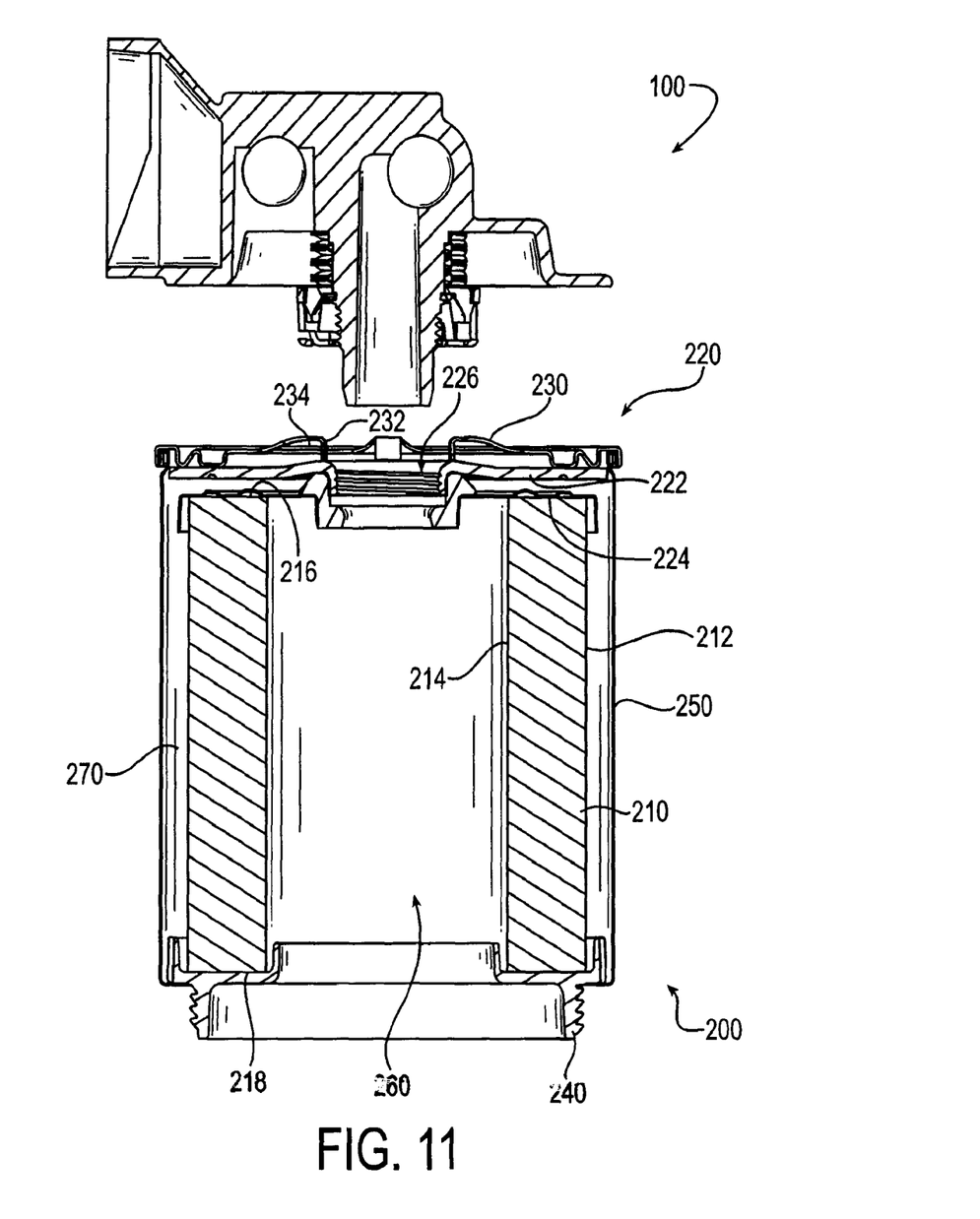
FIG. 11 shows a sectional view taken from view A-A of FIG. 3 of an exemplary filter element detached from an exemplary adapter assembly.
Figure 12:
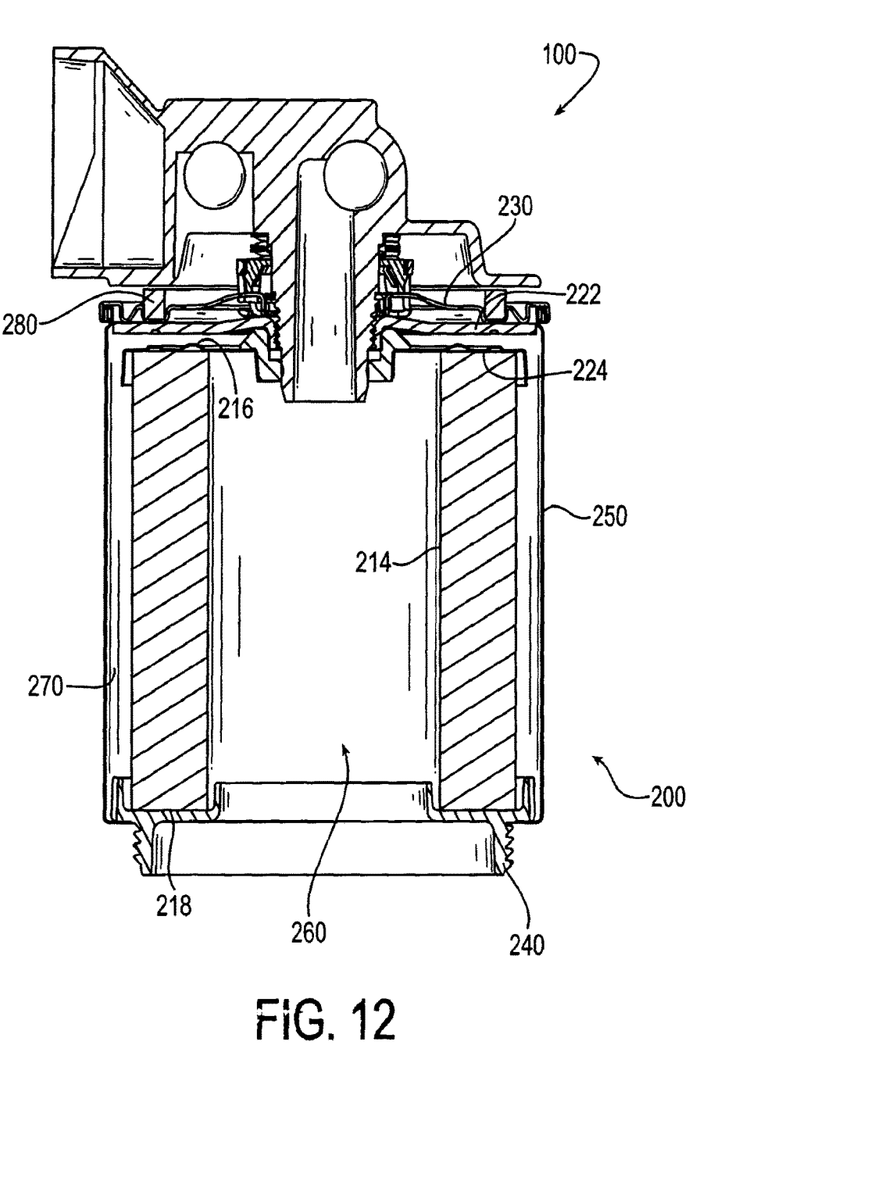
FIG. 12 shows a sectional view taken from view A-A of FIG. 3 of an exemplary filter element attached from an exemplary adapter assembly.

Referring now to FIGS. 10-12, illustrated is an exemplary filter element 200 for installation in an adapter assembly 100 with a keyed retractable shroud for covering external threads configured to receive the filter element. Although the illustrated filter element is intended as a fuel filter, the invention is not limited thereto, and could be utilized in other filters including oil filters, water filters, etc. The filter element 200 may include a filtering media 210, a first end cap 220, a second end cap 240, and sidewalls 250.

The filtering media 210 may be compiled in a cylindrical pack defining a longitudinal filter element axis. The media may be, for example, pleated or rolled. In pleated media, the fluid flow is typically in a direction perpendicular to the longitudinal axis (i.e. either from the outside to the inside, or vice-versa, of the cylindrical pack). In a rolled media filter, the media is rolled in a configuration similar to a roll of toilet paper and the flow typically goes from top to bottom (or vice-versa. The filtering media may have an outer radial surface 212, an inner radial surface 214 defining a fluid chamber 260, a first axial end face 216, and a second axial end face 218.

The first end cap 220 has a main body 222 with an axially inward side and an axially outward side. Further, the first end cap has an annular shelf 224 on the axially inward side on which the first axial end face 216 of the filtering media 210 sits. An interiorly threaded central passage (or aperture) 226 positioned radially inward of the annular shelf 224 is in fluid communication with the fluid chamber 260 of the filtering media 210 and is used to threadably engage and attach the filter element to the adapter 100. The end cap may include one or more fluid passageways for fluid communication an outer fluid chamber 270 positioned between the filtering media 210 and the sidewalls 250. The end cap 220 has a radially outer peripheral portion 272 attached to the canister 250. The radially outer peripheral portion 272 has a radially outermost, axially facing, rim surface 274 defining a plane. The end cap 220 is provided with an annular seal 280 (FIG. 12) protruding axially beyond the plane, and keyed fingers 230 that protrude axially beyond the plane. The keyed fingers 230 are formed from an annulus 276 of uniform cross section 278, wherein a periphery of the annulus 276 is attached to the canister 250. The annulus 276 has a radially outward circumferentially continuous portion from which the fingers 230 extend radially inwardly. The radially outward circumferentially continuous portion is radially outward of flow openings 282 provided in the annulus 276.

The one or more keyed fingers 230 coupled to the main body 222 protrude radially therefrom. The keyed fingers 230 are shaped, sized, and situated for insertion of the keyed fingers into the retractable shroud (latching body). In exemplary embodiments the keyed fingers 230 protrude radially inwardly and may be positioned on the axially outward side of the main body 222 and radially outward of the central bore 226. The keyed fingers may protrude axially away from the filter media (axially outward) in order to protrude into the keyed passages 172 of the latching body 160. In some exemplary embodiments, the fingers 230 may helically protrude from the first end cap 220. The keyed fingers 230 may include end portions 232 extending axially toward the filter media. Radially inward portions of the keyed fingers 230 (e.g., the end portions 232) may be free floating (in other words, the keyed fingers 230 may be cantilevered), or they may be attached to adjacent portions of the first end cap 220 (in other words, the fingers 230 may be axially extending closed hoops or the like). The keyed fingers 230 may thus be said to include a radially extending arm portion defining therebeneath a capture region 234. The keyed fingers 230, in order to engage the latching body may include radially extending arm portions spaced axially outwardly from the balance of the end cap. In other words, either the arms may extend axially outwardly and/or the main body may extend axially inwardly. The keyed fingers 234, therefore, define therebeneath a space axially and radially offset from the threaded aperture that can receive the cantilevered bridge portion 178 of the latching body 160 associated with the filter head/adapter.

Although any number of keys may be used, exemplary filters 200 include four keyed fingers 230.

Finally, the filter element may include a second cap 240 sealing the second axial edge of the filtering media. The second cap 240 may include threads for further engagement with another element. The second cap may be closed or may include one or more fluid passageways for fluid communication to the central fluid chamber 260 or an outer fluid chamber 270 positioned between the filtering media 210 and the sidewalls 250.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter element for installation in a filter head, the filter element including
   a canister enclosing a ring of media, and
   an end cap at an open end of the canister, the end cap including
      a main body with a threaded aperture for connecting the element with the filter head, and
      one or more keyed fingers protruding from the main body for engaging a locking mechanism associated with the filter head,
      wherein the one or more keyed fingers include a radially inwardly extending arm portion spaced axially outwardly from the main body to form an open space between the radially inwardly extending arm portion and the main body, the radially inwardly extending arm portion having a radially inner end that faces radially inwardly toward an open interior space that is axially outwardly from the threaded aperture, the radially inner end being disposed between gaps on circumferentially opposite sides thereof that communicate with the open interior space.

2. The filter element of claim 1, wherein the one or more keyed fingers are radially offset from the threaded aperture.

3. The filter element of claim 1, wherein the one or more keyed fingers are axially outwardly and radially offset from the threaded aperture.

4. The filter element of claim 1, wherein the radially extending arm portion terminates at the a radially inner end, and at an axially inwardly extending end portion.

5. The filter element of claim 1, wherein the open space is axially and radially offset from the threaded aperture and configured to receive a cantilevered bridge portion of a latching body associated with the filter head.

6. The filter element of claim 1, wherein the one or more keyed fingers protrude radially inwardly.

7. The filter element of claim 1, wherein the one or more keyed fingers include four keyed fingers.

8. The filter element of claim 1, wherein the one or more keyed fingers form an axially extending hoop.

9. The filter element of claim 1, further comprising a second cap at a second open end of the canister.

10. A filter element for installation in a filter element adapter assembly with a keyed retractable shroud for covering threads configured to receive the filter element, the filter element comprising:
    a filtering media compiled in a cylindrical pack defining a longitudinal axis and having an outer radial surface, an inner radial surface defining a fluid chamber, a first axial end face, and a second axial end face; and
    a first end cap having a main body with an axially inward side and an axially outward side, the end cap comprising:
       an annular shelf on the axially inward side on which the first axial end face of the filtering media sits,
       a threaded central passage positioned radially inward of the annular shelf in fluid communication with the fluid chamber of the filtering media, and
       one or more keyed fingers coupled to the main body and protruding axially from the main body, the one or more keyed fingers positioned on the axially outward side of the main body and radially outward of the threaded central passage,
       wherein the one or more keyed fingers include a radially inwardly extending arm portion spaced axially outwardly from the axially outward side of the main body to form an open space between the radially inwardly extending arm portion and the axially outward side, the radially inwardly extending arm portion having a radially inner end that faces radially inwardly toward an open interior space that is axially outwardly from the threaded aperture, the radially inner end being disposed between gaps on circumferentially opposite sides thereof that communicate with the open interior space.

11. The filter element of claim 10, wherein the one or more keyed fingers include a terminal end portion extending axially toward the filter media.

12. The filter element of claim 10, wherein a radially inward portions of the one or more keyed fingers is attached to adjacent portions of the end cap main body.

13. The filter element of claim 10, wherein the one or more keyed fingers extend radially inwardly form an annular peripheral portion of a canister enclosing the filtering media.

14. The filter element of claim 10 in combination with the retractable shroud, wherein the one or more keyed fingers are shaped, sized, and situated for full insertion of the one or more keyed fingers into the retractable shroud.

15. The filter element of claim 10, wherein the one or more keyed fingers form an axially extending hoop.

16. The filter element of claim 10, further comprising a second cap at the second axial end face of the filtering media.

17. The filter element of claim 1, wherein the radially inner end of the finger is closer to the threaded aperture than a radially outer periphery of the end cap.

18. A filter element for installation in a filter head, the filter element including
    a canister enclosing a ring of media, and
    an end cap at an open end of the canister, the end cap including
       a main body with a threaded aperture for connecting the filter element with the filter head and
       one or more keyed fingers protruding from the main body for engaging a locking mechanism associated with the filter head,
       wherein the one or more keyed fingers are formed from an annulus of uniform cross section, wherein a periphery of the annulus is attached to the canister;
       wherein the one or more keyed fingers include a radially inwardly extending arm portion, the radially inwardly extending arm portion having a radially inner end that faces radially inwardly toward an open interior space that is axially outwardly form the threaded aperture, the radially inner end being disposed between gaps on circumferentially opposite sides thereof that communicate with the open interior space.

19. The filter element of claim 18, wherein the annulus has a radially outward circumferentially continuous portion from which the fingers extend radially inwardly.

20. The filter element of claim 19, wherein the radially outward circumferentially continuous portion is radially outward of flow openings provided in the annulus.

21. The filter element of claim 18, wherein the radially inwardly extending arm portion of the one or more keyed fingers is spaced axially outwardly from the main body to form an open space between the radially inwardly extending arm portion and the main body.

22. A filter element for installation in a filter head, the filter element including
   a canister enclosing a ring of media, and
   an end cap at an open end of the canister, the end cap including
      a main body with a threaded aperture for connecting the filter element with the filter head, and
      one or more keyed fingers protruding form the main body for engaging a locking mechanism associated with the filter head,
   wherein the end cap has a radially outer peripheral portion attached to the canister, the radially outer peripheral portion having a radially outermost, axially facing, rim surface defining a plane,
   wherein the end cap is provided with an annular seal protruding axially beyond said plane, and
   wherein the one or more keyed fingers protrude axially beyond said plane;
   wherein the one or more keyed fingers include a radially inwardly extending arm portion, the radially inwardly extending arm portion having a radially inner end that faces radially inwardly toward an open interior space that is axially outwardly from the threaded aperture, the radially inner end being disposed between gaps on circumferentially opposite sides thereof that communicate with the open interior space.

* * * * *